(12) United States Patent
Natarajan

(10) Patent No.: US 9,383,836 B2
(45) Date of Patent: *Jul. 5, 2016

(54) STYLUS KEYBOARD

(71) Applicant: AT&T Intellectual Property I, L.P., Atlanta, GA (US)

(72) Inventor: Vijayarani Natarajan, Norcross, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/969,440

(22) Filed: Dec. 15, 2015

(65) Prior Publication Data

US 2016/0098106 A1   Apr. 7, 2016

Related U.S. Application Data

(63) Continuation of application No. 13/706,848, filed on Dec. 6, 2012, now Pat. No. 9,250,708.

(51) Int. Cl.
*G06F 3/033* (2013.01)
*G06F 3/02* (2006.01)
*G06F 3/0354* (2013.01)

(52) U.S. Cl.
CPC .......... *G06F 3/03545* (2013.01); *G06F 3/0202* (2013.01); *G06F 3/0221* (2013.01); *G06F 2200/1632* (2013.01)

(58) Field of Classification Search
CPC ... G06F 3/033; G06F 3/03545; G06F 3/0489; G06F 3/03547; G06F 3/041; G06F 3/0412; G06F 3/0414; G06F 3/0416; G06F 3/0418; G06F 2200/1634; G06F 2203/0381; G06F 2203/0339; G06F 2203/04101; G06F 2203/04103; G06F 2203/04105
See application file for complete search history.

(56) References Cited

U.S. PATENT DOCUMENTS

| | | |
|---|---|---|
| 4,720,610 A | 1/1988 | MacHarrie |
| 4,812,831 A | 3/1989 | Laier |
| 5,241,303 A | 8/1993 | Register et al. |
| 5,334,976 A | 8/1994 | Wang |
| 5,440,502 A | 8/1995 | Register |
| 5,625,354 A | 4/1997 | Lerman |
| 6,265,993 B1 | 7/2001 | Johnson |
| 6,603,408 B1 | 8/2003 | Gaba |
| 6,625,649 B1 | 9/2003 | D'Souza et al. |
| 6,727,894 B1 | 4/2004 | Karidis et al. |
| 6,796,734 B2 | 9/2004 | Ye |

(Continued)

OTHER PUBLICATIONS

G-Tech, G-Tech Smart Fabric Wireless Keyboard, http://www.amazon.com/G-Tech-Smart-Fabric-Wireless-Keyboard/dp/B000IZCUE6.

(Continued)

*Primary Examiner* — Ilana Spar
*Assistant Examiner* — Nguyen H Truong
(74) *Attorney, Agent, or Firm* — Hartman & Citrin LLC

(57) ABSTRACT

A combination of a stylus and a keyboard. A collapsible keyboard portion is coupled to a stylus tip. When in a collapsed state, the apparatus may be used as a stylus, or stored in a receptacle or a user's pocket. When a keyboard is needed, the stylus keyboard may be unrolled or unfolded, and used to control an electronic device via a wireless connection between a transceiver on the stylus keyboard and the electronic device.

20 Claims, 4 Drawing Sheets

(56) References Cited

U.S. PATENT DOCUMENTS

| | | | |
|---|---|---|---|
| 6,861,961 B2 | 3/2005 | Sandbach et al. | |
| 6,894,661 B1 | 5/2005 | Tuli | |
| 6,940,497 B2 | 9/2005 | Vincent et al. | |
| 7,742,290 B1 | 6/2010 | Kaya | |
| 7,748,667 B1 | 7/2010 | Bartholomew | |
| 8,125,347 B2 | 2/2012 | Fahn | |
| 2003/0025668 A1 | 2/2003 | Lin | |
| 2003/0106781 A1 | 6/2003 | Ye | |
| 2003/0109286 A1* | 6/2003 | Hack | H04M 1/0208 455/566 |
| 2004/0013457 A1 | 1/2004 | Morris | |
| 2004/0240924 A1 | 12/2004 | Ye | |
| 2005/0063570 A1 | 3/2005 | Kim | |
| 2006/0165463 A1 | 7/2006 | Katz | |
| 2007/0051591 A1 | 3/2007 | Otsuka et al. | |
| 2007/0097087 A1 | 5/2007 | Homer et al. | |
| 2007/0171205 A1 | 7/2007 | Steinberg | |
| 2008/0166175 A1 | 7/2008 | Pittel et al. | |
| 2008/0303782 A1 | 12/2008 | Grant et al. | |
| 2009/0128523 A1 | 5/2009 | Sheynkman et al. | |
| 2009/0184884 A1 | 7/2009 | Kyou et al. | |
| 2009/0184927 A1 | 7/2009 | Lynn | |
| 2009/0250328 A1 | 10/2009 | Tseng | |
| 2009/0273587 A1 | 11/2009 | Tsuei et al. | |
| 2010/0271310 A1 | 10/2010 | Olodort et al. | |
| 2010/0277327 A1 | 11/2010 | Lee | |
| 2011/0102328 A1 | 5/2011 | Chen | |
| 2011/0217932 A1 | 9/2011 | Hsieh | |
| 2011/0241607 A1 | 10/2011 | Wiegers | |
| 2011/0241999 A1 | 10/2011 | Thier | |
| 2011/0306882 A1 | 12/2011 | Hannon et al. | |
| 2011/0311289 A1 | 12/2011 | Wu | |
| 2012/0224316 A1 | 9/2012 | Shulenberger | |
| 2012/0243163 A1 | 9/2012 | Kim | |
| 2012/0244915 A1 | 9/2012 | Hawkins et al. | |
| 2013/0002606 A1 | 1/2013 | Mann | |
| 2013/0215035 A1 | 8/2013 | Guard | |
| 2013/0268929 A1 | 10/2013 | Tyhurst et al. | |

OTHER PUBLICATIONS

Kevin Parrish, Jorno Intros World's Smallest Folding Keyboard, Tom's Hardware, Sep. 21, 2012, http://www.tomshardware.com/news/Jorno-Bluetooth-Kickstarter-Wedge-Mobile-Windows-8,17734.html.

Ryan Block, Eleksen's new ElekTex Bluetooth fabric keyboard, ENGADGET, Jan. 16, 2006, http://www.engadget.com/2006/01/16/eleksens-new-elektex-bluetooth-fabric-keyboard/.

U.S. Office Action dated Jun. 4, 2014 in U.S. Appl. No. 13/706,848.
U.S. Office Action dated Oct. 10, 2014 in U.S. Appl. No. 13/706,848.
U.S. Office Action dated Feb. 9, 2015 in U.S. Appl. No. 13/706,848.
U.S. Office Action dated May 13, 2015 in U.S. Appl. No. 13/706,848.
U.S. Notice of Allowance dated Aug. 31, 2015 in U.S. Appl. No. 13/706,848.

* cited by examiner

FIG. 2A  FIG. 2B

STYLUS KEYBOARD

CROSS-REFERENCE TO RELATED APPLICATIONS

This application is a continuation of, and claims priority to U.S. patent application Ser. No. 13/706,848, entitled "Stylus Keyboard," filed Dec. 6, 2012, now U.S. Pat. No. 9,250,708, which is incorporated herein by reference in its entirety.

BACKGROUND OF THE SUBJECT DISCLOSURE

1. Field of the Subject Disclosure

The subject disclosure relates to input devices. More specifically, the subject disclosure relates to a wireless rollable keyboard including a stylus tip for a touch-sensitive display.

2. Background of the Subject Disclosure

Touch-sensitive displays, also referred to as touchscreens, are input/output devices that are increasingly being found in electronic devices everywhere, such as cellular telephones, touch pads, tablets, and laptops. Moreover, basic tasks such as navigating information kiosks, checking in for flights, and ordering fast food, are being performed using touchscreens. However, despite their numerous advantages, touchscreens have not yet entirely replaced keyboards, especially for text input, sending and receiving emails, and typing documents. Frequent travelers that work outside a traditional office setting have to carry around external keyboards that occupy space and may use excessive power. At present, there are no convenient means for enabling text input into a device having a touchscreen that addresses these concerns.

BRIEF DESCRIPTION OF THE DRAWINGS

FIGS. 2A-2C show an accordion-style foldable stylus keyboard, according to an example embodiment of the subject disclosure.

DETAILED DESCRIPTION OF THE SUBJECT DISCLOSURE

The subject disclosure presents devices and systems for enhanced input using a combination of a stylus and a keyboard. One example embodiment of the subject disclosure may include an input device. The device includes a collapsible keyboard, a stylus tip coupled to the collapsible keyboard, and a transceiver coupled to the collapsible keyboard. The transceiver enables the collapsible keyboard to wirelessly transmit keystrokes to an electronic device. In another example embodiment, the subject disclosure may include a flexible keyboard. The flexible keyboard includes a plurality of touch-sensitive regions and a stylus tip coupled to the plurality of touch-sensitive regions. The flexible keyboard is adapted to be collapsible to form a stylus handle. There are many different ways to embody the subject disclosure. For simplicity, the following example embodiments present, for the most part, a minimal amount of structure necessary to achieve the functions of the subject disclosure. In many of the following example embodiments, one device, network, terminal, memory, logic, etc. is shown where a plurality may be used in tandem to achieve the same function. Those having skill in the art will recognize these pluralities, which are within the scope of the subject disclosure.

Figure 1A:
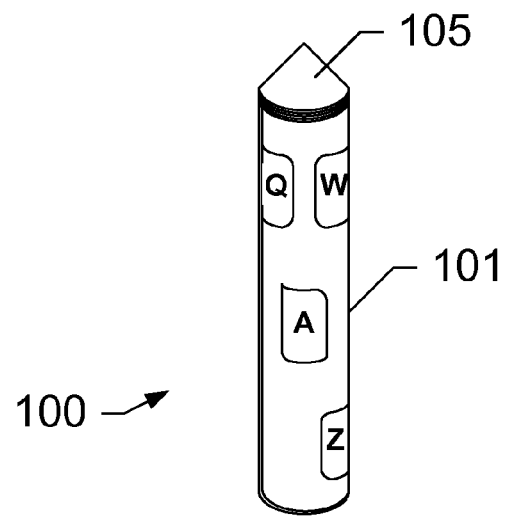
FIGS. 1A and 1B show a rollable stylus keyboard, according to an example embodiment of the subject disclosure.
Figure 1B:
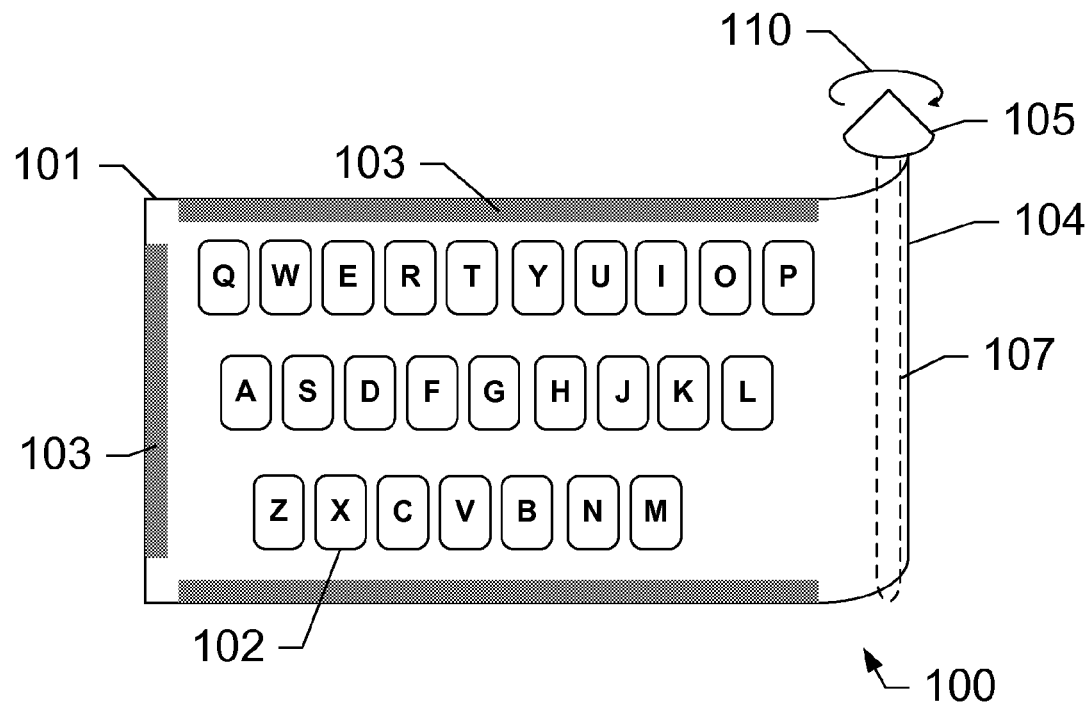

FIGS. 1A and 1B show a rollable stylus keyboard 100, according to an example embodiment of the subject disclosure. Rollable stylus keyboard 100 may include at least a rollable keyboard portion 101, and a stylus tip 105. Rollable keyboard portion 101 may be rolled up to form a cylindrical shaft that can be used as a stylus handle, enabling a user to manipulate a touchscreen using stylus tip 105. Other components such as logic, memory, transceivers, etc. may be included either within rollable keyboard portion 101, stylus tip 105, or any combination thereof.

Referring to FIG. 1B, rollable keyboard portion 101 may be unrolled and laid flat, exposing a plurality of regions corresponding to keys 102. Rollable keyboard portion 101 may be unrolled in a direction indicated by arrow 110. Keys 102 may include any type of input key commonly used in regular keyboards. Although a QWERTY layout is shown, other layouts and key combinations may be possible. Circuitry for detecting a keystroke applied by a user's finger may be embedded within rollable keyboard portion 101, or anywhere on rollable stylus keyboard 100 such as tip 105. Rollable keyboard portion 101 may include one or more fastening mechanisms 103 dispersed at regions around a perimeter, front side, or back side of rollable keyboard portion 101. For instance, fastening mechanisms 103 may be adhesive strips placed on a back side of rollable keyboard portion 101 to enable typing on a smooth surface. One or more adhesive strips, Velcro strips, or other fastening mechanisms 103 may be used to retain rollable stylus keyboard 100 in a fully rolled position, as shown in FIG. 1A. Rollable keyboard portion 101 may be rolled around an edge portion 104 coupled to stylus tip 105, to form a stylus handle.

Further, an optional stylus body 107 may be included, enabling a rollable keyboard portion 101 to roll around a structure. Stylus body 107 may be coupled to edge portion 104 of rollable keyboard portion 101, and may additionally store components such as the aforementioned transceiver/processor/memory combination, an antenna, or a communications bus enabling connectivity between rollable keyboard portion 101 and other components stored in stylus tip 105, or anywhere else within rollable stylus keyboard 100. Stylus body 107 may also act as an antenna. Stylus body 107 is an optional component, and may not be necessary, as rollable keyboard portion 101 may be substantially rigid and used as a stylus body when in a fully rolled position, such as depicted in FIG. 1A. Stylus body 107 may further include a spring mechanism such that rollable keyboard portion 101 may more easily return to the fully rolled position. The spring mechanism may be activated by a button, by pulling rollable keyboard portion 101 away from stylus body 107, etc.

Figure 2C:
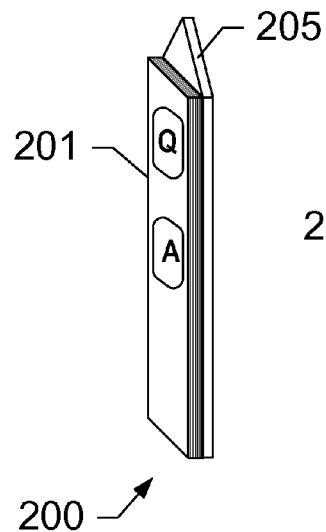
Figure 2C:
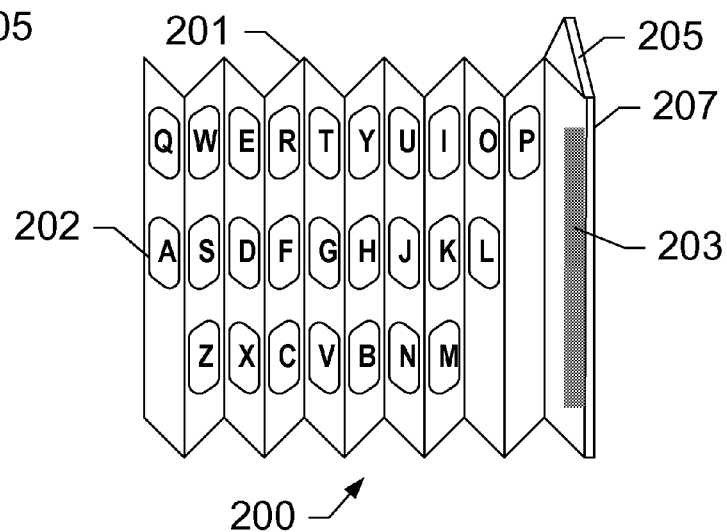
Figure 2C:
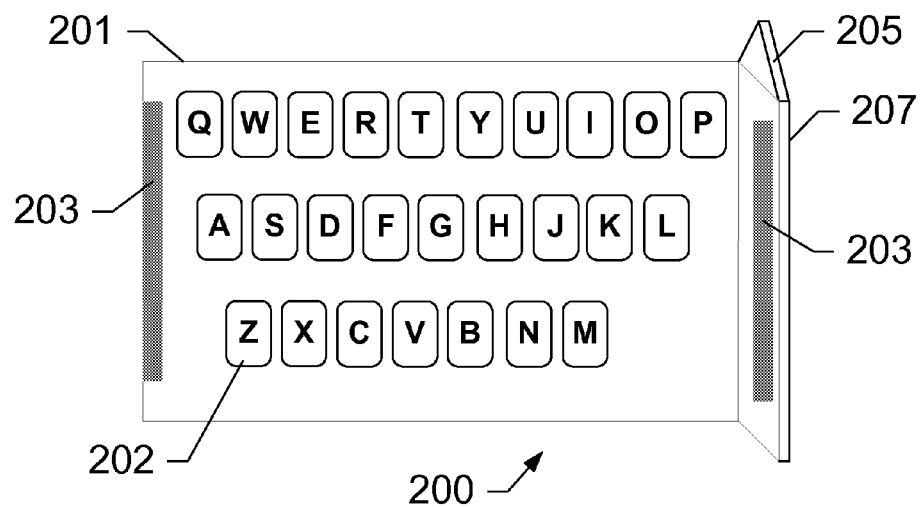

FIGS. 2A-2C show an accordion-style foldable stylus keyboard 200, according to an example embodiment of the subject disclosure. Stylus keyboard 200 may include at least a foldable keyboard portion 201, and a stylus tip 205. Foldable keyboard portion 201 may be folded to form a shaft or handle that can be used as a stylus handle, enabling a user to manipulate a touchscreen using stylus tip 205. Other components such as logic, memory, transceivers, etc. may be included either within foldable keyboard portion 201, stylus tip 205, or any combination thereof.

Referring to FIG. 2B, foldable keyboard portion 201 may be unfolded like an accordion, for instance along predefined fold lines, exposing a plurality of regions corresponding to keys 202. Foldable keyboard portion 201 may be held in place by an adhesive or other fastening mechanism 203 to an edge portion 207, which is a part of foldable keyboard portion 201. In other embodiments, edge portion 207 may be rigid, acting as a stylus handle.

Referring to FIG. 2C, foldable keyboard portion 201 may be laid flat on a surface and used to operate a device such as a computer, by responding to a user's activation or depression of keys 202. Keys 202 may include any type of input key commonly used in regular keyboards. Although a QWERTY layout is shown, other layouts and key combinations may be possible. Circuitry for detecting a keystroke applied by a user's finger may be embedded within foldable keyboard portion 201, or anywhere on foldable stylus keyboard 200, such as stylus tip 205 or stylus body 207. Besides presently known or future technology for flexible touch-sensitive surfaces, this circuitry may include interfaces to a bus for communicating with transceivers, power supplies, or other equipment. The circuitry may further include exposed contacts or ports providing a hard-wired interface to other devices such as a charger, mobile device, etc.

Foldable keyboard portion 201 may also include one or more fastening mechanisms 203 dispersed at regions around a perimeter, front side, or back side of foldable keyboard portion 201. For instance, fastening mechanisms 203 such as adhesive strips may be placed on a back side of foldable keyboard portion 201 to enable typing on a smooth surface without slipping. One or more adhesive strips, Velcro strips, or other fastening mechanisms 203 may be used to retain foldable stylus keyboard 200 in a folded state, as shown in FIG. 2A.

Any component of foldable stylus keyboard 200, such as foldable keyboard portion 201, stylus tip 205, or stylus body 207, may additionally store components such as the aforementioned transceiver/processor/memory combination, an antenna, or a communications bus enabling connectivity between foldable keyboard portion 201 and other components stored in stylus tip 205, or anywhere else within foldable stylus keyboard 200. These components may be distributed in any combination, depending upon the physical configuration of foldable stylus keyboard 200, a user preference, or a device or dock for holding foldable stylus keyboard 200. Moreover, any component may further act as an antenna, enabling wireless communication with devices.

Figure 3:
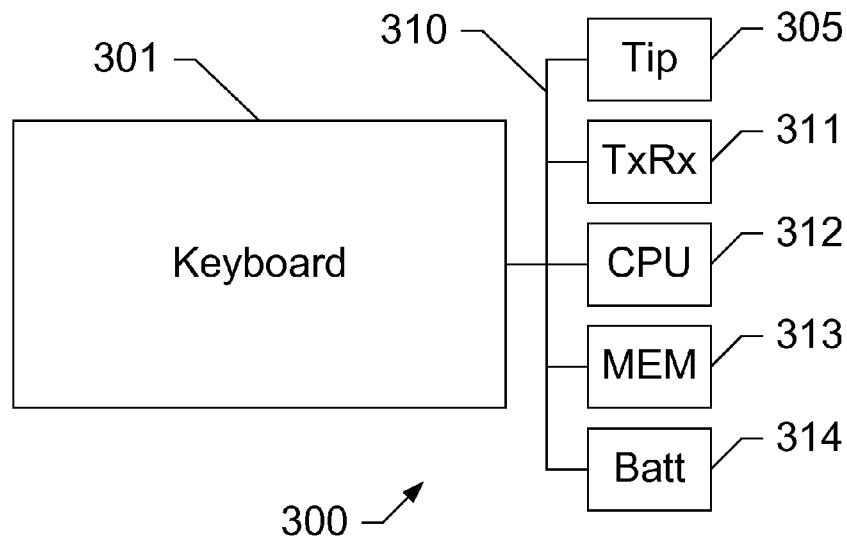
FIG. 3 shows components of a stylus keyboard, according to an example embodiment of the subject disclosure.

FIG. 3 shows components of a stylus keyboard 300, according to an example embodiment of the subject disclosure. Stylus keyboard 300 includes a keyboard portion 301, a tip 305, a transceiver 311, a processor 312, a memory 313, and a battery 314. These components may communicate with each other across a bus 310. As described above, keyboard portion 301 may be any flexible keyboard with a plurality of touch-sensitive regions corresponding to keys or other commands. Keyboard portion 301 may include a navigation pad, operable as a mouse or touch pad. The touch-sensitive regions of keyboard portion 301 may be configurable in any desired pattern.

Tip 305 may be made of any material capable of operating a touchscreen display. For capacitive touchscreens that typically require a human finger to operate, tip 305 may include one or more conductive materials. Further, a stylus handle or portions of keyboard portion 301 may also include such conductive materials, enabling conductivity between a human hand holding stylus keyboard 300, and a touchscreen being operated. Tip 305 may further house additional components, whether shown or not shown, so the depiction of components in FIG. 3 should be interpreted as logical rather than structural. The components may be housed within each other, and in any order or arrangement necessary to construct a portable stylus keyboard.

Transceiver 311 may be any currently known or future wireless transceiver, enabling communication with an electronic device such as a cellular telephone, tablet, computer, etc. For instance, transceiver 311 may be a BLUETOOTH®, NFC, WiFi, ZIGBEE®, or Z-WAVE® transceiver. Transceiver 311 may utilize any currently known or later developed technologies including Radio Frequency (RF) transceivers, Gigabit Interface Converter (GBIC), small form-factor pluggable transceiver (SFP), enhanced small form-factor pluggable (SFP+), etc.

Stylus keyboard 300 may include an antenna. This antenna may be a transducer for transmitting and receiving wireless radio frequency (RF) signals to and from wireless networks, network nodes, and other wireless communication devices including a BLUETOOTH® transceiver, radiofrequency (RFID) reader, wireless base transceiver station (BTS), WiFi access point, etc. Any component of stylus keyboard 300 may be utilized as an antenna.

Processor 312 is any processor that may perform various operations by virtue of being able to execute logical operations to operate components such as transceiver 311. Processor 312 may incorporate any presently known or later developed technologies including computer processors (central processing units), microprocessors, digital signal processors, controllers and microcontrollers, etc. For instance, logical instructions stored on memory 313 may be executed by processor 312 to receive keystrokes from keyboard portion 301 via bus 310, and transmit these keystrokes as commands to an external device via transceiver 311.

Memory 313 may store logical instructions enabling processor 312 to operate the components of stylus keyboard 300. Memory 313 may also store a unique identifier for stylus keyboard 300, such as a BLUETOOTH® profile, a radiofrequency identifier (RFID), etc. In some embodiments, memory 313 may store profiles for one or more external devices operable by stylus keyboard 300. Logic stored on memory 313 may also be comprised by digital and/or analog hardware circuits, for example, hardware circuits comprising logical AND, OR, XOR, NAND, NOR, and other logical operations. Logic may be formed from combinations of software and hardware.

Battery 314 may be used to power stylus keyboard 300 and components described herein. Battery 314 can be any of the presently known or later developed technologies used in mobile devices or used in powering communication components including lithium-Ion batteries, lithium-polymer batteries, molten salt batteries, etc. Further, battery 314 may be charged via a power port (not shown), inductively, or via a power source coupled to a cover or casing applied to stylus keyboard 300. Battery 314 may further be charged inductively while stylus keyboard 300 is in use, and within a sufficient proximity to receive a charge.

Figure 4:
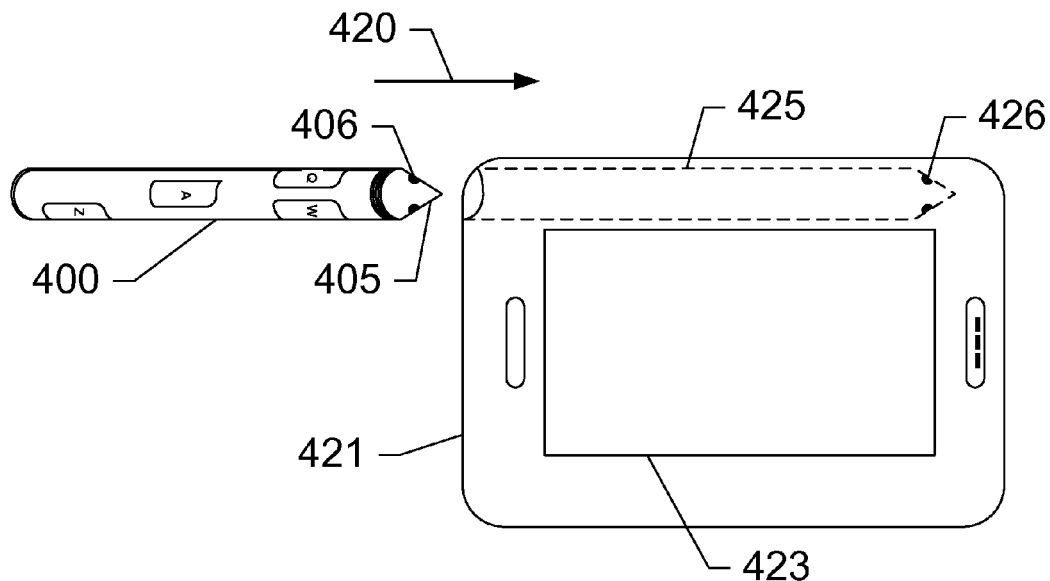
FIG. 4 shows a stylus keyboard attachable to a mobile device, according to an example embodiment of the subject disclosure.

FIG. 4 shows a stylus keyboard 400 attachable to a mobile device 421, according to an example embodiment of the subject disclosure. Mobile device 421 may be adapted to receive stylus keyboard 400, for instance, via an aperture or receptacle 425. In this way, stylus keyboard 400 may be kept discreetly hidden until it needs to be used, either to operate display 423 in stylus form, or to be unrolled or unfolded and used as a keyboard. Mobile device 421 may include a plurality of components, including but not limited to a display 423. Display 423 may be used as visual output for mobile device 421, and may be any of the currently known or later developed display technologies including Light Emitting Display (LED), Liquid Crystal Display (LCD), Electroluminescent Display (ELD), Organic Light Emitting Diode (OLED), carbon nanotubes, nanocrystal displays, etc. Display 423 may also be a touchscreen, such as a capacitive or resistive touchscreen, operable by stylus tip 405. Mobile device 421 may additionally include a processor, a memory, a transceiver, and other components necessary to effectuate communication with stylus keyboard 400, receive commands from stylus keyboard 400, etc.

As described above with reference to FIG. 3, a battery within stylus keyboard 400 may be charged via induction, or via power ports 426. For instance, stylus tip 405 of stylus keyboard 400 may include one or more exposed contacts 406. When stylus keyboard is inserted into receptacle 425 of mobile device 421 along the direction represented by arrow 420, exposed contacts 406 come into electrical contact with power ports 426. These power ports 426 enable charging of stylus keyboard 400 using, for instance, a battery or power source coupled to mobile device 421. During inductive charging, the battery may be charged while stylus keyboard 400 is in use, so long as stylus keyboard 400 is within a sufficient proximity to mobile device 421 or any other power source.

In some embodiments, power ports 426 may not be power ports, but may instead be mechanical switches that are activated upon entry or removal of stylus keyboard 400 to or from receptacle 425. Upon activation (or deactivation) mobile device 421 may be able to stop charging of stylus keyboard 400, launch an application to receive commands from stylus keyboard 400, etc. Using power ports 426 as mechanical switches may use inductive charging for stylus keyboard 400. Any combination of mechanical switches and electrical contacts is possible with a mating of exposed contacts 406 and power ports 426.

Figure 5:
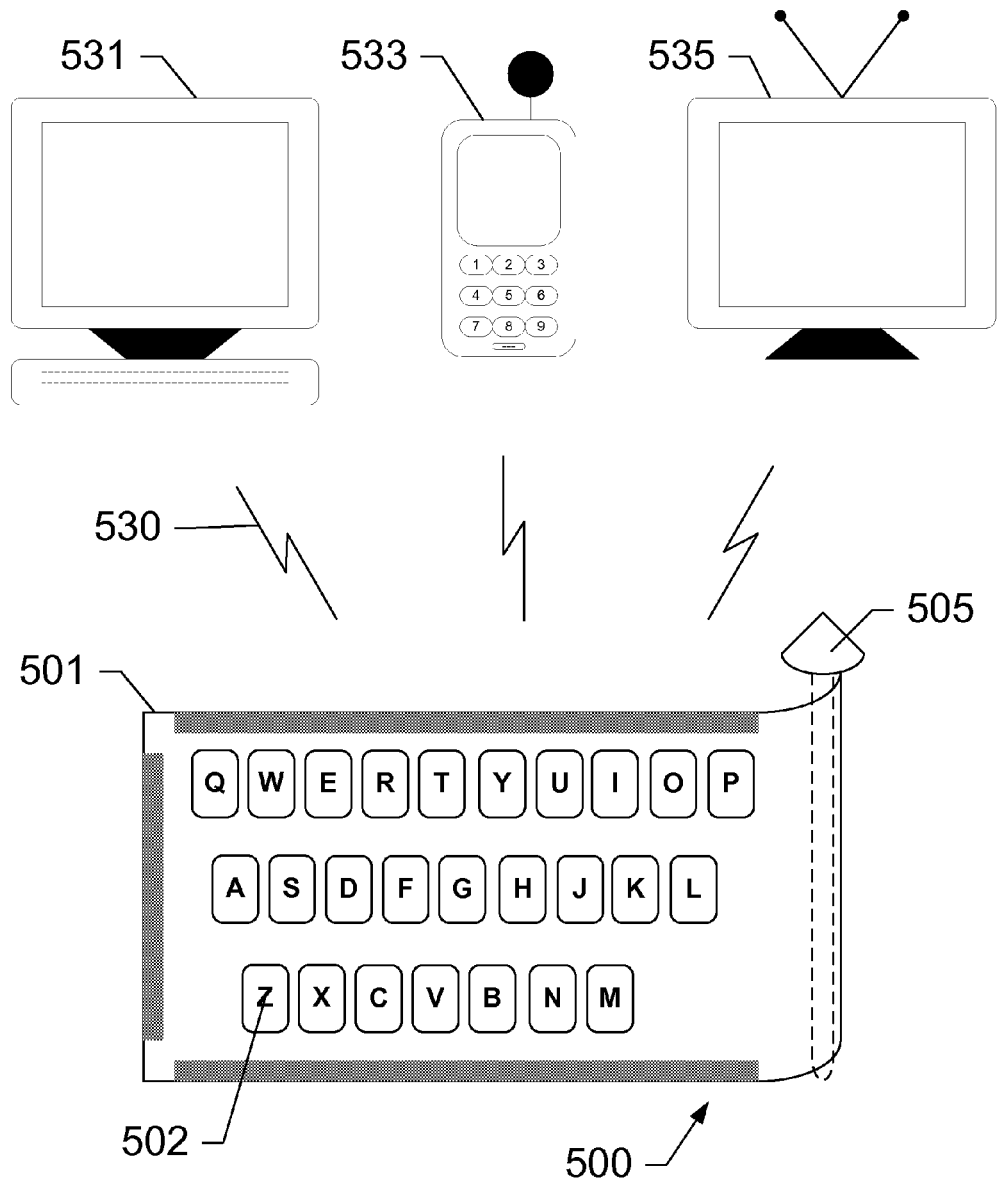
FIG. 5 shows a system for controlling one or more devices with a stylus keyboard, according to an example embodiment of the subject disclosure.

FIG. 5 shows a system for controlling one or more devices with a stylus keyboard 500, according to an example embodiment of the subject disclosure. This control occurs via communication channels 530. For instance, rollable keyboard portion 501 may be unrolled, and a particular command or keystroke combination depressed in order to enable communication between stylus keyboard 500 and one or more of electronic devices 531, 533, or 535. Standard registration procedures may be employed to "pair" these devices with stylus keyboard 500. Further, communication channel 530 may be accomplished via any wireless technology, such as NFC, BLUETOOTH®, WiFi, broadband, etc. Consequently, electronic devices 531, 533, and 535 may include appropriate transceivers, such as network adapters, subscriber identity modules (SIM), or universal integrated circuit cards (UICC), etc.

Further, devices 531, 533, and 535 may have more than one transceiver, capable of communicating over different networks, and with each other. For example, devices 531, 533, and 535 may include logic for communicating an identifier of stylus keyboard 500, such as a BLUETOOTH® profile, enabling other electronic devices to trust an operator of stylus keyboard 500. This enables a user of a single stylus keyboard to operate a plurality of electronic devices that he or she may own. A memory onboard stylus keyboard 500 may be programmed with a trust level or a "friendly" status from one or more of devices 531, 533, or 535, enabling future use without any setup procedures. This trust level, or any additional information about stylus keyboard 500 may be communicated across devices 531, 533, and 535 to enable usage of multiple devices with a single stylus keyboard 500.

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

I claim:

1. A device comprising:
    a stylus handle that is formed by a collapsible keyboard when the collapsible keyboard is in a collapsed state, the collapsible keyboard comprising a rollable keyboard portion comprising touch-sensitive regions and an edge portion, wherein the stylus handle is formed by the rollable keyboard portion being rolled around the edge portion to form a cylindrical shaft that acts as a stylus body, and wherein the collapsible keyboard does not include a separate stylus body;
    a stylus tip attached to the edge portion;
    a battery;
    a transceiver configured to wirelessly transmit keystrokes to a mobile device;
    a memory;
    a processor; and
    a bus that connects the collapsible keyboard to each of the memory, the processor, and the transceiver, wherein the memory stores a unique identifier that identifies the collapsible keyboard, and a profile associated with the mobile device.

2. The device of claim 1, further comprising
    a first fastening mechanism that retains the collapsible keyboard in the collapsed state; and
    a second fastening mechanism located on an opposite edge portion of the collapsible keyboard, wherein the second fastening mechanism retains the collapsible keyboard in an extended state on a surface external to the device.

3. The device of claim 1, wherein the stylus tip is conductive.

4. The device of claim 1, wherein the stylus tip is conductive, and wherein the stylus tip is used to operate a resistive touch screen.

5. The device of claim 1, wherein communications are enabled between the transceiver and the mobile device in response to a keystroke combination detected at the collapsible keyboard.

6. The device of claim 1, wherein one of the touch-sensitive regions comprises a navigation pad.

7. A stylus comprising:
  a stylus handle that is formed from a flexible keyboard, the flexible keyboard comprising a rollable keyboard portion comprising touch-sensitive regions and an edge region that is attached to the touch-sensitive regions, wherein the stylus handle is formed by the rollable keyboard portion being rolled around the edge region to form a cylindrical shaft that acts as a stylus body, and wherein the flexible keyboard does not include a separate stylus body;
  a stylus tip attached to the edge region;
  a transceiver that is configured to wirelessly transmit keystrokes to a device;
  a memory;
  a battery;
  a processor; and
  a bus that connects the flexible keyboard to each of the memory, the processor, and the transceiver, wherein the memory stores a unique identifier that identifies the flexible keyboard to the device, and a profile associated with the device.

8. The stylus of claim 7, wherein one of the touch-sensitive regions comprises a navigation pad.

9. The stylus of claim 7, further comprising a contact point in electrical communication with the battery, wherein the contact point enables charging of the battery by an external power source.

10. The stylus of claim 9, wherein the external power source comprises a further battery associated with the device.

11. The stylus of claim 7, wherein the device comprises a receptacle that houses the stylus handle, and wherein the battery is inductively charged when the stylus is located at the receptacle.

12. The stylus of claim 11, wherein upon removing the stylus from the receptacle, the device launches an application to receive a command from the stylus, wherein the command comprises a keystroke combination.

13. The stylus of claim 7, wherein the stylus tip is conductive.

14. The stylus of claim 7, wherein the stylus tip is conductive, and wherein the stylus tip is used to operate a resistive touch screen.

15. A device comprising:
  a stylus handle that is formed by a foldable keyboard when the foldable keyboard is in a folded state, the foldable keyboard comprising a foldable keyboard portion comprising a plurality of fold lines and touch-sensitive regions, wherein the stylus handle is formed by the foldable keyboard portion being collapsed to act as a stylus body, and wherein the foldable keyboard does not include a separate stylus body;
  a stylus tip attached to the foldable keyboard;
  a transceiver that is configured to wirelessly transmit keystrokes to a mobile device;
  a memory;
  a battery;
  a processor; and
  a bus that connects the foldable keyboard to each of the memory, the processor, and the transceiver, wherein the memory stores a unique identifier that identifies the foldable keyboard to the mobile device, and a profile associated with the mobile device.

16. The device of claim 15, wherein the foldable keyboard is inserted into a receptacle of the mobile device when the foldable keyboard is in the folded state.

17. The device of claim 15, wherein the mobile device comprises:
  a receptacle; and
  a mechanical switch located within the receptacle, wherein upon activation of the mechanical switch by insertion of the device within the receptacle, the mobile device charges the battery, wherein upon deactivation of the mechanical switch by removing the device from the receptacle, the mobile device launches an application to receive a command from the device.

18. The device of claim 17, wherein the command comprises a keystroke combination.

19. The device of claim 15, wherein one of the touch-sensitive regions comprises a navigation pad.

20. The device of claim 15, wherein the stylus tip is conductive.

* * * * *